(12) United States Patent
Rostroem

(10) Patent No.: US 6,243,011 B1
(45) Date of Patent: Jun. 5, 2001

(54) OPTOELECTRIC SAFETY SYSTEM FOR A FOLDING PRESS

(75) Inventor: Göran Rostroem, Schaffhausen (CH)

(73) Assignee: Sick AG (DE)

( * ) Notice: Subject to any disclaimer, the term of this patent is extended or adjusted under 35 U.S.C. 154(b) by 0 days.

(21) Appl. No.: 09/402,808

(22) PCT Filed: Apr. 23, 1998

(86) PCT No.: PCT/CH98/00159

§ 371 Date: Oct. 7, 1999

§ 102(e) Date: Oct. 7, 1999

(87) PCT Pub. No.: WO98/47645

PCT Pub. Date: Oct. 29, 1998

(30) Foreign Application Priority Data

Apr. 23, 1997 (CH) .................................................. 0943/97

(51) Int. Cl.[7] .................................................. G08B 13/18
(52) U.S. Cl. .................. 340/556; 340/557; 250/559.12; 250/559.13; 250/559.15
(58) Field of Search .................................... 340/679, 680, 340/556, 557, 555; 250/221, 559.11, 559.12, 559.13, 559.15, 559.16

(56) References Cited

U.S. PATENT DOCUMENTS

| | | | |
|---|---|---|---|
| 4,085,928 | * 4/1978 | Sussman | 270/61 R |
| 4,109,233 | * 8/1978 | Erickson | 340/553 |
| 4,249,074 | * 2/1981 | Zettler et al. | 250/221 |
| 4,520,262 | * 5/1985 | Denton | 250/221 |
| 4,660,703 | * 4/1987 | Filcich et al. | 192/130 |
| 4,907,432 | * 3/1990 | Maillefer | 72/1 |
| 5,198,661 | * 3/1993 | Anderson et al. | 250/221 |
| 5,218,196 | * 6/1993 | Dogul et al. | 250/221 |
| 5,243,183 | * 9/1993 | Barron, Jr. et al. | 250/222.1 |
| 5,245,178 | * 9/1993 | Elias | 250/221 |
| 5,281,809 | * 1/1994 | Anderson et al. | 250/221 |
| 5,559,664 | * 9/1996 | Dogul et al. | 361/191 |

FOREIGN PATENT DOCUMENTS 0562726   9/1993   (EP) .

* cited by examiner

*Primary Examiner*—Jeffery Hofsass
*Assistant Examiner*—Toan Pham
(74) *Attorney, Agent, or Firm*—Bachman & LaPointe, P.C.

(57) ABSTRACT

An optoelectric safety system which protects a free entrance or access opening in a machine's protective housing or protective cage at all times during operation. The system includes a reflection light scanner on the machine frame above and adjacent the floor at the front of the machine in the vicinity of the entrance or access opening, which emits a scanning beam covering a horizontal or inclined area and which generates an inner permanent protective field and an outer dynamic protective field.

23 Claims, 5 Drawing Sheets

OPTOELECTRIC SAFETY SYSTEM FOR A FOLDING PRESS

BACKGROUND OF THE INVENTION

The invention relates to an optoelectrical safety system for a machine that operates with at least some mechanically dangerous operating processes, in particular for a folding press, a system which protects a free entrance and/or access opening in the machine's protective housing or protective cage at all times during operation. The invention also relates to a method for the operation of the device.

Optoelectric safety systems, in particular safety light barriers, are widely used in industrial practice to indicate the penetration of people, human limbs, animals or objects into a protected or dangerous area. Typical applications of safety light barriers are, for example, the protection of people from injuries in the danger zone of machines, for example stamping presses, folding presses, lever linkages, casting machines, coil winding machines, robotic machinery etc. For the sake of simplicity, here and in what follows the main functional equivalents of ultrasound, camera image, heat image and similar protective systems will be summarised under the term "optoelectric safety systems".

A safety system for a folding press or a similarly functioning machine is described in EP, A1 0264349. In this a bundle of laser beams is sent from a transmitter on one side of the press to a receiver on the other side of the press. The bundle is routed parallel to the edge of the stamp and at distance δ from the sheet surface of the workpiece. In the folding operation the edge of the stamp is lowered in a vertical plane, which also contains the laser bundle. The speed of the stamp is measured by the bundle of laser beams and braked if a preset speed is exceeded. Because the distance δ of the laser bundle from the plate roughly corresponds with the thickness of a human finger, this safety measure should allow a finger to be withdrawn in good time.

EP, A1 0562726 describes a safety light barrier made up of at least two parts, which should detect the penetration of objects into a protected zone more effectively. The light barrier can, for example, be angled, with each segment consisting of a transmitter and receiver for an area protection system made up of a multi-beam light barrier. All transmitters and receivers of the segments are connected together in series, which should permit an angled layout to suit each individual case.

According to EP, A1 0264349 these and similar familiar systems are associated with a relatively large residual risk or in the case of EP, A1 0562726 require a complicated layout of safety light barriers, which hinders the free manipulation of machines.

The inventor has set himself the task of creating an optoelectric safety system of the type described at the start, which provides maximum safety, is flexible in use, is inexpensive and conforms to all legal standards.

With regard to the device, the task is solved according to the invention by the presence of
  an approximately vertical column at either side of the entrance and/or access opening, each with a transmitter or receiver for a safety light barrier in the form of a multi-beam protective field covering an area,
  a reflection light scanner above the floor at the front of the machine in the vicinity of the entrance and/or access opening, covering a horizontal or inclined area, with specifiable inclination and/or geometry, which generates an inner permanent and an outer dynamic protective field.

specific and further variants of the protective system are the subject of the dependent patent claims.

The combination of an approximately vertical safety light barrier forming the first protective field and at least one preferably semi-circular area generated by a reflection light scanner forming the second protective field with an inner permanent and outer dynamic area provides ideal conditions that have never been achieved before with regard to safety and optimal operating processes, which can be further improved by preferred measures.

An optoelectric, but also a functional equivalent safety system as described above can be used in a large number of industrial machines with at least one dangerous operation. Examples are listed above. Particularly important are folding presses, for example program controlled bending presses, and machines with similar operation.

Safety light barriers themselves are known, for example from EP, A2 0281747. A safety light barrier is made up in the form of a multi-beam protective field covering an area, whereby the distance between individual beams is as laid down in the specifications. If one or more of the light beams is interrupted an electrical signal is generated which, via an actuator, triggers a machine stop, for example, or a change in the working speed, possibly to creep speed, or a visual and/or acoustic signal.

The reflection light scanner using light time measurement is also in itself familiar, for example from the EP, A2 0281748. With a radius of around 15 m a semicircular area totalling 350 m2 can be covered. Within this area Pcs can be used to define two protective fields as required:
  In a secure protective field, the danger zone, a person can be detected and a dangerous machine movement stopped immediately.
  In an adjacent warning protective field a warning signal can be triggered if a person is detected outside the actual danger zone.

Unlike the safety light barrier, a reflection light scanner does not use a transmitter/receiver, and it does not need a reflector. An extremely short pulse of light is emitted and directed via a rotating mirror, thus covering a semicircular area as described. At the same time an electronic time measurement process is initiated. If the scanning beam encounters an obstacle, the diffuse reflected light is detected by a sensor and at the same time the time or distance measurement stopped. The distance to the diffuse reflecting object is calculated from the time difference between the transmitted and received impulse and a predetermined zone allocated (safe protected field, warning protective field, outside monitoring zone). By this means the protective field can be precisely adapted to the danger zone, the installation cost is lower and there are no mechanical devices to obstruct work.

The resolution of the safety light barrier and the reflection light scanner in the danger zone is such that a finger-sized penetrating object can trigger a signal, therefore the resolution will preferably be at least around 15 mm, in particular at least around 10 mm. This provides the greatest possible safety, the danger zone generally ends 30–40 cm from the machine part with a dangerous movement, meaning that for there to be any danger an entire hand, not just one finger, must be placed in the danger zone, before there is danger of injury. A hand, knee or foot exceeds the minimum resolution capacity by several times.

Folding presses and similarly functioning sheet processing machines have vertically and laterally adjustable consoles to hold the workpiece, which protrude into the protected danger zone. Individual light beams from the safety light barrier must therefore be masked so that the folding press can be operated with a workpiece inserted. Therefore penetration openings, preferably lined up, are blanked out for at least some of the beams from the safety light barrier, guaranteeing unimpeded passage. The consoles may optionally be made of transparent material at least in the area of light penetration. Suitable consoles in this context consist for example of Plexiglas or another transparent, mechanically strong plastic.

The two columns that generate the safety light barrier are mounted on a base plate or directly upon the floor, as appropriate, by screws for example. This sets firstly the distance from the machine and secondly the width of the light barrier. These upright columns obstruct the function of the protective field generated by the reflection light scanner, depending upon the cross-section of the column an inactive "shadow" shaped like the sector of a circle is generated. Clearly, the closer a column is placed to the reflection light scanner, i.e. to the machine, the larger is this shadow. However, there are other factors in favour of placing the columns as close to the machine as possible.

Therefore, in a particularly advantageous design variant of the invention the columns have a greatly reduced cross-section in the area of the protective field of the reflection light scanner in the direction of the scanning light beam. In practice, this is achieved in one of the first variants by making perforations in the direction of the light beam, particularly from slits running along the columns in the longitudinal direction. According to a further variant the columns can be completely split in the area in question and the two parts held apart by at least three or four rods. For reasons of stability one or two connecting rods are less favourable, their effective cross-section would be greater than is the case for three or four thinner rods statically well distributed over the cross-section. It should also be noted that as many rods as possible should be aligned with each other in relation to the light beam. If there are three rods only two are hit by the light beam, the third lies in the "shadow" of another rod.

The length of the perforations or the rods is optimised with regard to the stability of the upright columns and the adjustability of the protective field of the reflection light scanner, taking into account the size of the safety light barrier.

If appropriate, the columns are connected to their footplate via a lockable spherical adjuster. This allows optimal adjustment within a suitably limited angular range. Such spherical adjustment mechanisms are known. The preferred all-round adjustment angle β in relation to the vertical is a maximum of around 10°.

According to a further special design variant of the invention the protective field of the reflection light scanner is not horizontal, but is specified as a diagonal plane at a suitable angle a of 10–45°, in particular 10–30°, in relation to the horizontal. The reflection light scanner is fastened onto the machine housing or machine frame at the appropriate angle. Installation generally takes place directly above the floor on the front of the machine. The inclined path of the protective scanning field increases the possibilities for adding further peripheral devices and guarantees a large amount of working freedom for the operator. The angle of this area forming the protective field can be adjusted either manually by familiar mechanical means or using programmed actuators. Although the protective field is generally semicircular, it can have any desired geometric shape.

As mentioned above, the reflection light scanner defines a safe protective field in the danger zone, which is referred to here as the inner permanent protective fields. This can be freely defined within a semicircle of diameter 8 m, for example. An object protruding into this area immediately triggers the stopping of the dangerous work operation at the machine or at least its dramatic slowing to a creep speed of around 10 mm/sec. An outer dynamic protective field from the reflection light scanner adjoins the inner permanent protective field. This is also freely definable within a semicircle with a diameter of, for example, 30 m with the aid of light time measurement. When an object penetrates the outer dynamic protective field an alarm may be triggered and/or the working speed of the machine markedly reduced, for example in a folding press the stamp is only lowered at the above-mentioned speed of just 10 mm/sec.

Further safety measures can be employed by the use of integrated mechanical guards in addition to the area of the inner permanent protective field of the reflection light scanner. In special cases the inner permanent protective field of the reflection light scanner can also be replaced by this mechanical system.

In principle, the optoelectric safety system is independent of the machine type. It can easily be exchanged or retrofitted. Particularly advantageous are machine independent standard components, which can even be designed as add-on modules.

With regard to the method, the problem is solved by the invention in that when the protective system is switched on the interruption of at least one unmasked light beam of the safety light barrier and/or diffused light in an unmasked reflection position of the scanner beam of the reflection light scanner generates an electric signal, which in turn triggers the actuator of a machine operating unit and/or an alarm. Special and additional design variants of this method are the subject of the dependent patent claims.

Machines equipped with a normal optoelectric safety system, in particular folding presses, have a manual operating mode selection switch, which is used to specify the machine speed during setting up, production etc. According to an advantageous further development of the invention the operating mode can be automatically determined when there is a certain transition from one protective field to the other. If the appropriate equipment is present a suitable protective field selection can also be detected automatically.

Furthermore, a CNC control with a variance comparison can be used for workpiece recognition.

The preferred light beams for use in the optoelectric safety system are laser beams, particularly those in the visible and IR range.

SUMMARY OF THE INVENTION

The main advantages of the invention can be summarised as follows:

A protective field directly above floor height at the front of the machine, in combination with a safety light barrier offers the greatest possible safety combined with significantly more free space for movement.

The options for adding further peripheral devices are significantly improved.

Reduced cross-section or interrupted columns permit an expansion of the protective field of the reflection light scanner. The protective system can be designed as an add-on unit for various machine types.

The protective system can be adapted to all national statutory regulations.

BRIEF DESCRIPTION OF THE DRAWINGS

The invention will be explained in more detail based upon the design examples represented in the drawing. The following are shown schematically.

DETAILED DESCRIPTION OF PREFERRED EMBODIMENTS

Figure 1:
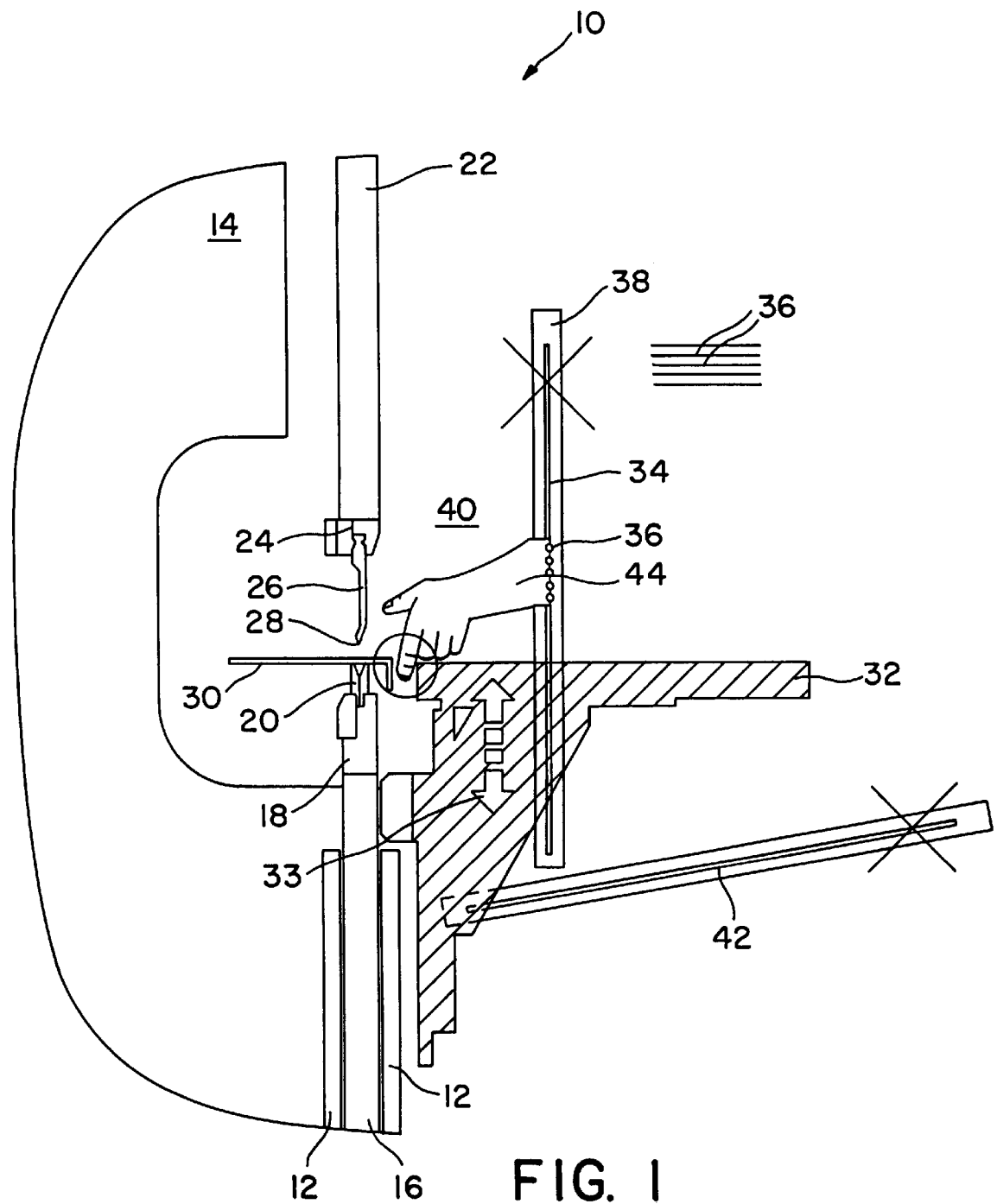
FIG. 1 A side view of a folding press shown as a bending press with two light barriers (state of the art)

FIG. 1 depicts a state of the art folding press 10 with an outlined machine frame 12 and a protective housing or protective cage 14, also in outline only.

A tool holder 18 is fastened to the lower yoke 16, and the dies 20, for example with v-shaped longitudinal grooves, are clamped into this. A tool holder 24 is attached to an upper yoke 22 for a stamp 26 that can be lowered with great pressure and precise path definition, which is angled in the working area and ends in a wedge-shaped stamp edge 28.

There is a workpiece 30 on the die 20, a metal sheet that has already been bent once.

At least two consoles 32 to hold the workpiece 30 are coupled to the machine frame 12 so that they move longitudinally, these consoles also move vertically, as indicated by arrows 33.

An optoelectric safety system for the folding press 10 incorporates a vertical light barrier 34 with parallel beams which are around 15 mm apart, running perpendicular to the drawing sheet and are shown rotated. These beams 36 are transmitted from the first column 38 on one side of the machine and received by a second column 38 on the other side of the machine. The safety light barrier 34 completely covers the access opening 40 in the protective housing 14 of the machine.

A second light barrier 42 of the safety system, slightly inclined in relation to the horizontal, is depicted in the same way as the vertical light barrier 34, it runs at an angle to this. The operator's freedom of movement is clearly greatly restricted by this.

According to the instantaneous view in FIG. 1, both light barriers 34 are inactive. The operator's forearm 44 is reaching through the vertical light barrier 34 and interrupting the beam 36, which is shown as a dotted line in this area. The folding press 10 is already switched off or set to creep speed.

In the vicinity of the console 32 the beams 36 are masked so that these do not switch off the machine or even not allow it to start up in the first place.

The lower light barrier 42 is also inactive, because the beams in the area of console 32 are not masked and/or the operator's leg has penetrated this protective field.

Figure 2:
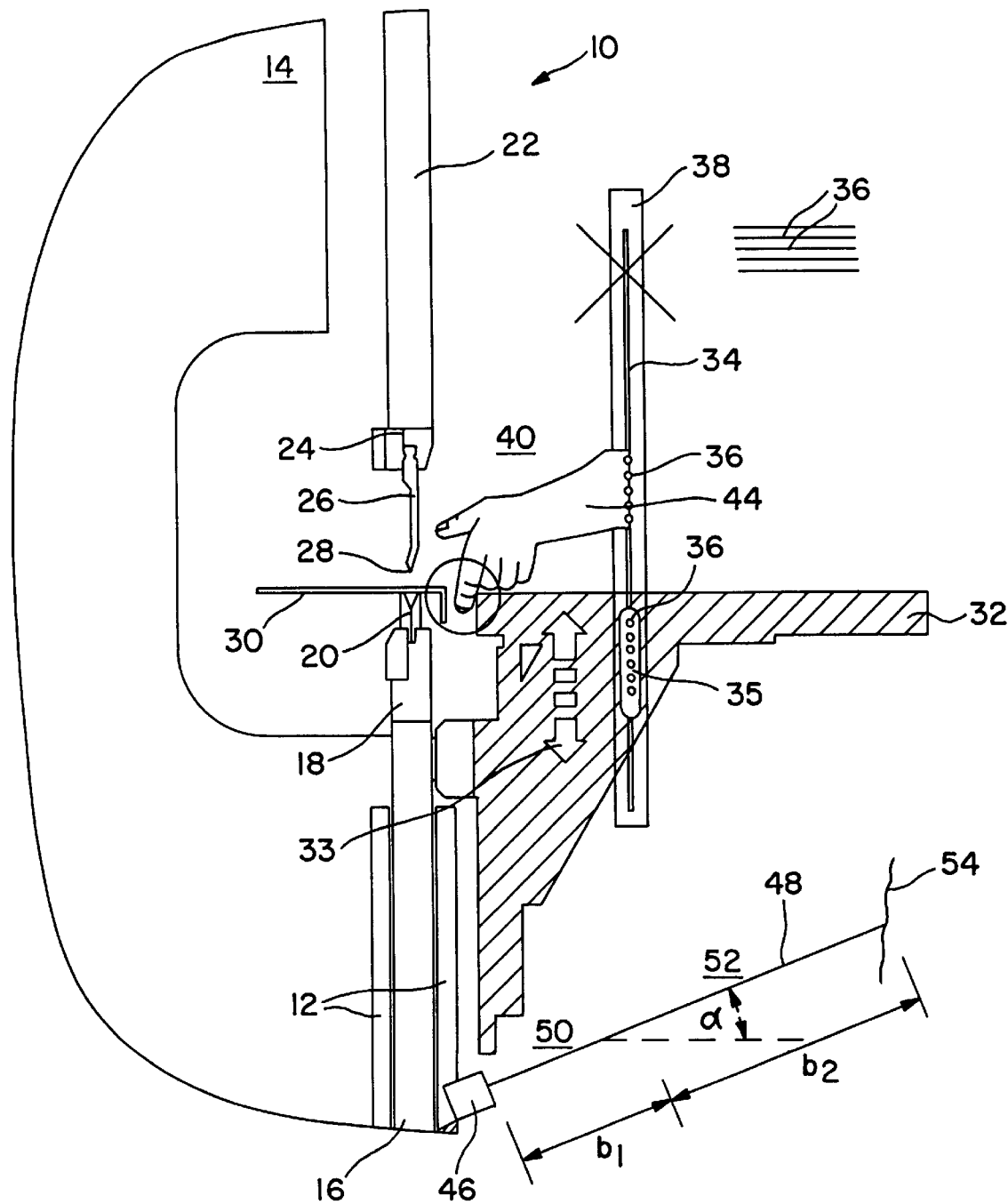
FIG. 2 A further development of FIG. 1 in accordance with the invention with a safety light barrier and a reflection light scanner, FIG. 3 A view of a folding press with optoelectric safety system, FIG. 4 A horizontal projection in accordance with FIG. 3, FIG. 5 A side view in accordance with FIGS. 3 and 4, FIG. 6 A slightly angled column, and FIG. 7 The effects of split columns of a safety system.

In the design format according to the invention shown in FIG. 2, the lower, angled light barrier 42 is missing in comparison with FIG. 1. On the machine frame 12 next to the floor a reflection light scanner 46 is positioned such that it covers an inclined, preferably semicircular, area. The protective field 48 this creates is at an angle α to the horizontal of around 20°. Width b1 forms an inner permanent protective field 50, the adjoining width b2 forms an outer dynamic protective field 52.

When the scanning beam of protective field 48 encounters the operator's trousers 54 a diffuse reflection is created, a very small part of the beam emitted by the reflection light scanner 46 returns to a receiver, where it is detected and evaluated.

The consoles 32 have a longitudinal slit as a penetration opening 34 for the beams 36 of the safety light barrier 34 in this area.

Figure 3:
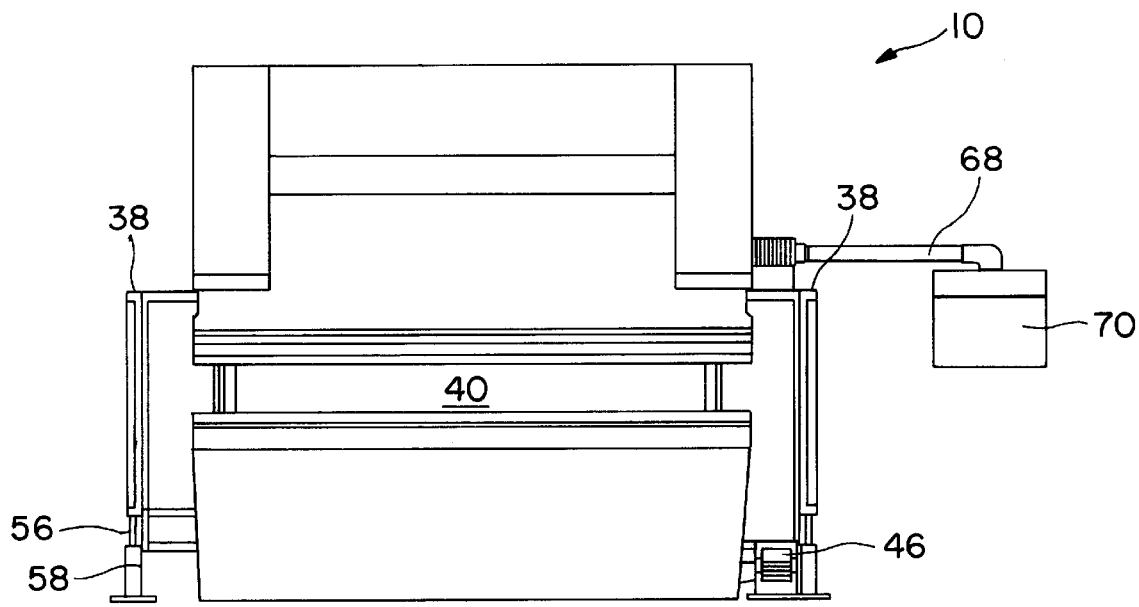
Figure 4:
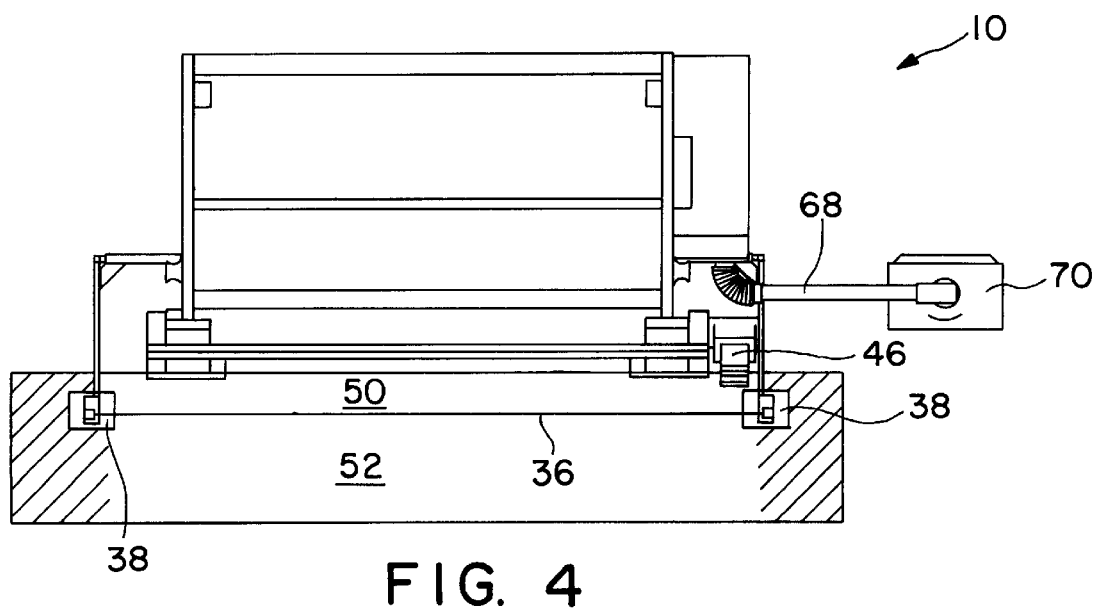

FIGS. 3 and 4 show the layout of the columns 38 generating the safety light barrier 34 and the reflection light scanner 46. The columns 38 incorporate a footplate 58 separated by three small cross-section rods 56. Thanks to the split columns 38 the protective field size is increased by the shaded area shown in FIG. 4.

The electronics are contained in a monitor 70 with screen and operating unit which is coupled to the machine frame 12 by a swivel arm 68.

Figure 5:
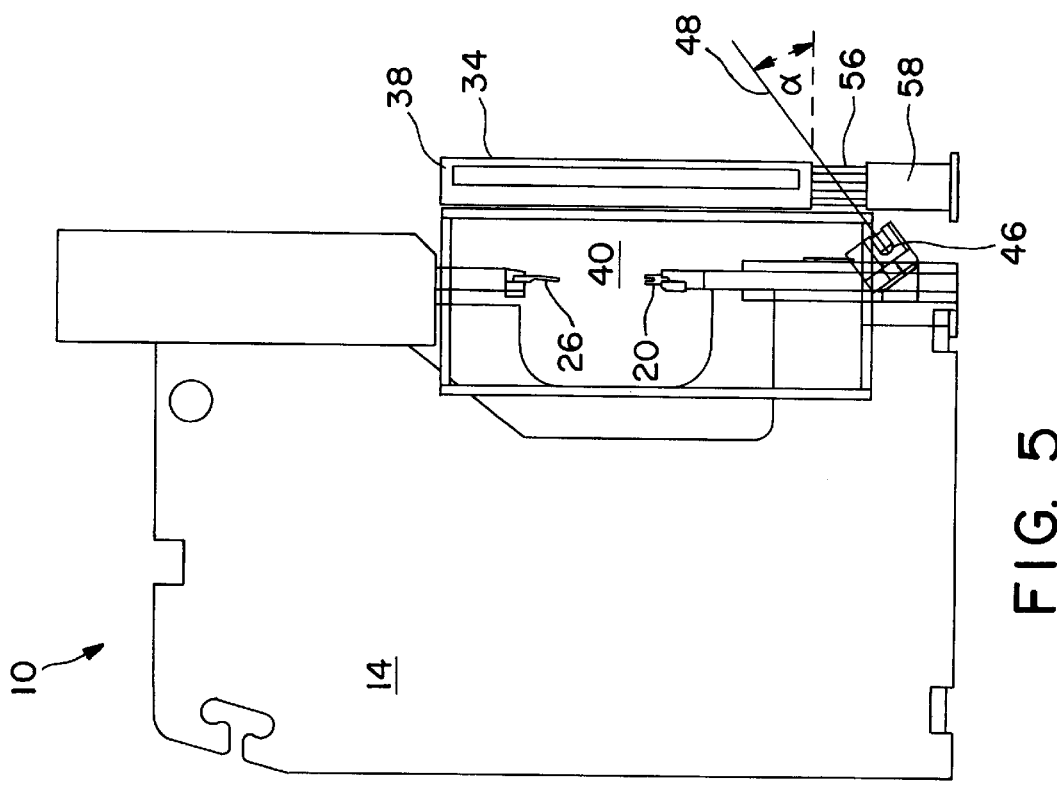

The division of the columns 38 is more easily recognisable from FIG. 5. Despite their small cross-section the three rods 56 form a stable connection to the footplate 58. The rods 56 are arranged so that the scanning beam 59 (FIG. 7) of the protective field 48 can also hit a column 38 next to it with little loss. The diffusion radiation generated by the rods 56 is masked.

Figure 6:
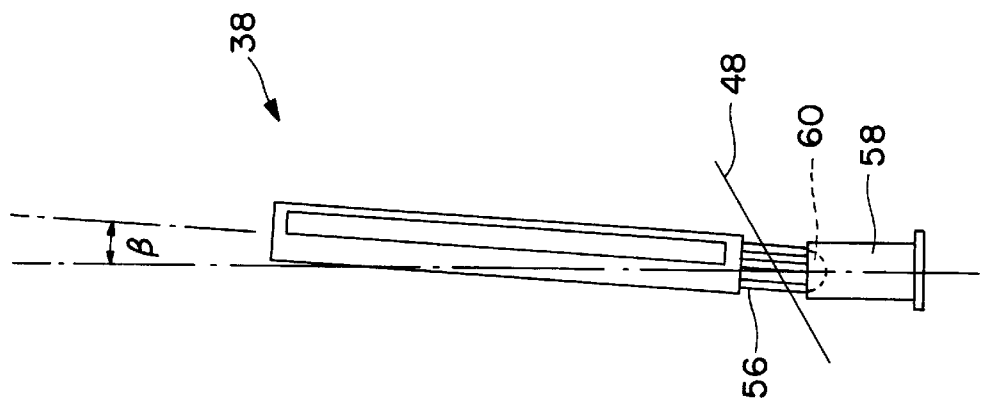

A column as shown in FIG. 6 can be used more flexibly because it is connected to its footplate 58 via a lockable spherical adjuster 60. The angle of adjustment β in relation to the vertical is just under 5°.

Figure 7:
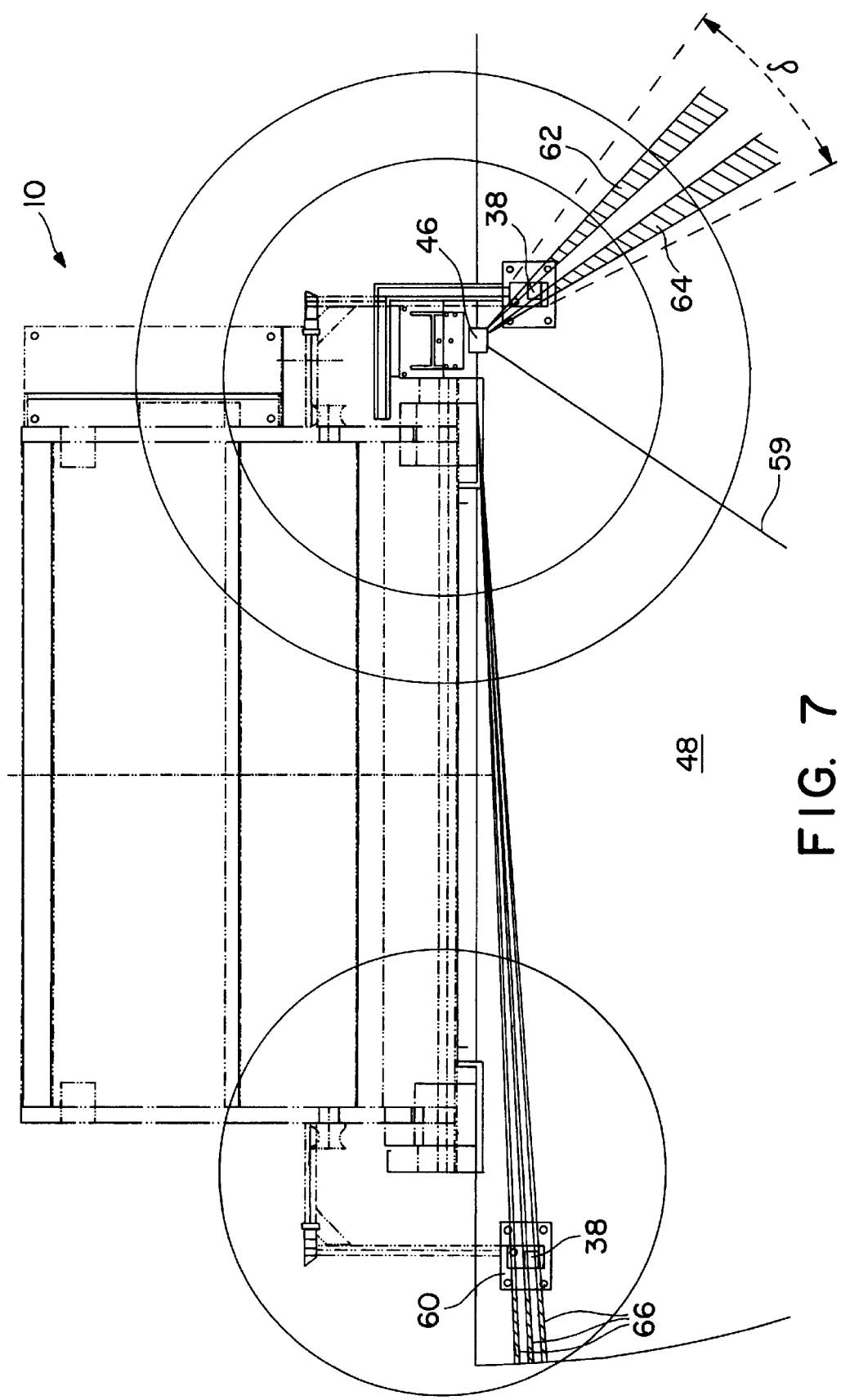

FIG. 7 shows the protective field 48 running diagonally upwards from a reflection light scanner 46 with a scanning beam 49 running through it in the area behind the column 38. Both columns are in accordance with FIG. 6. A column 38 in the vicinity of the reflection light scanner 46 without a division or narrowing in the area of the protective field 48 would throw a broad shadow, indicated as a shaded area, an inactive sector-shaped zone of angle δ. The rods 56 (FIG. 6) throw two significantly smaller shaded shadow fields 62, 64, whereby the third rod lies in shadow field 62 and does not generate its own shadow.

In the column 38 away from reflection light scanner 46 the rods are not aligned, therefore three very narrow shadow fields 66 are generated. The angle δ of a column 38 without a reduction in cross-section in the field of protective field 48 would be much smaller here, roughly comparable with the shadow fields 62, 64.

What is claimed is:

1. Optoelectric safety system for a machine that operates with at least some mechanically dangerous operating processes, which comprises:

a system which protects a free entrance or access opening in the machine's protective housing or protective cage at all times during operation, including:

an approximately vertical column at either side of the entrance or access opening, each column with at least one of a transmitter and receiver for an approximately vertical safety light barrier in the form of a multi-beam protective field covering an area;

a reflection light scanner on the machine frame above and adjacent the floor at the front of the machine in the vicinity of the entrance or access opening, which emits a scanning beam covering a horizontal or inclined area with specifiable at least one of inclination (α) and geometry, which generates an inner permanent protective field and an outer dynamic protective field, outside of the vertical light barrier and towards an operator.

2. A safety system according to claim 1, wherein said machine is a folding press.

3. A safety system according to claim 1, the safety light barrier and the reflection light scanner have a resolution of at least around 15 mm in the machine danger zone, whereby at least one of (1) single or multiple beams of the safety light barrier and (2) reflection positions of the protective field of the reflection light scanner, can be masked.

4. A safety system according to claim 3, wherein said resolution is at least around 10 mm.

5. A safety system according to claim 1, wherein the columns in the vicinity of the protective field of the reflection light scanner have a greatly reduced cross-section in the radial direction of the scanning beam.

6. A safety system according to claim 1, wherein the columns are connected to a foot plate by a lockable spherical adjuster.

7. A safety system according to claim 6, wherein said columns have an adjustment angle ($\beta$) in relation to the vertical on all sides to a maximum of 10°.

8. A safety system according to claim 1, including a semicircular protective field of the reflection light scanner in the form of a diagonal plane at an angle ($\alpha$) of 10–45° to the horizontal.

9. A safety system according to claim 8, wherein said angle ($\alpha$) is from 10–30°.

10. A safety system according to claim 1, wherein the linear dimensions of the inner permanent and the outer dynamic protective field of the reflection light scanner are adjustable.

11. A safety system according to claim 1, wherein the inner permanent protective field of the reflection light scanner is at least supplemented by integrated mechanical guards.

12. A safety system according to claim 1, wherein said system is constructed as an exchangeable or retro-fittable, machine independent standard component.

13. A safety system according to claim 12, wherein the rods are aligned in the direction of the scanning beam.

14. Method for the operation of a device according to claim 1 wherein, with the system switched on the interruption of at least one of (1) at least one non-masked light beam from the safety light barrier, and (2) diffused light in a non-masked reflection position of the scanning beam from the reflection light scanner, generates an electric signal, which in turn triggers at least one of an actuator of a machine operated unit and an alarm device.

15. Method according to claim 14, wherein different operating modes of the machine are automatically triggered by protective field selection.

16. Method according to claim 14, wherein detection is used automatically to select a suitable protective field.

17. Method according to claim 14, wherein a controller recognizes workpieces using variance comparison.

18. Method according to claim 14, wherein laser beams are used.

19. Method according to claim 18, wherein said laser beams are in at least one of the visible and IR range.

20. Optoelectric safety system for a machine that operates with at least some mechanically dangerous operating presses, which comprises:
    a system which protects a free entrance or access opening in the machine's protective housing or protective cage at all times during operation, including:
    an approximately vertical column at either side of the entrance or access opening, each column with at least one of a transmitter and receiver for an approximately vertical safety light barrier in the form of a multi-beam protective field covering an area;
    a reflection light scanner above the floor at the front of the machine in the vicinity of the entrance or access opening, which emits a scanning beam covering a horizontal or inclined area with specifiable at least one of inclination ($\alpha$) and geometry, which generates an inner permanent and outer dynamic protective field; and
    at least one console to hold workpieces having aligned penetration openings for the beams of the safety light barrier.

21. Optoelectric safety system for a machine that operates with at least some mechanically dangerous operating presses, which comprises:
    a system which protects a free entrance or access opening in the machine's protective housing or protective cage at all times during operation, including:
    an approximately vertical column at either side of the entrance or access opening, each column with at least one of a transmitter and receiver for an approximately vertical safety light barrier in the form of a multi-beam protective field covering an area;
    a reflection light scanner above the floor at the front of the machine in the vicinity of the entrance or access opening, which emits a scanning beam covering a horizontal or inclined area with specifiable at least one of inclination ($\alpha$) and geometry, which generates an inner permanent and outer dynamic protective field; and
    at least one console to hold workpieces which is at least partially made of a translucent material for penetration of the beams of the safety light barrier.

22. Optoelectric safety system for a machine that operates with at least some mechanically dangerous operating presses, which comprises:
    a system which protects a free entrance or access opening in the machine's protective housing or protective cage at all times during operation, including:
    an approximately vertical column at either side of the entrance or access opening, each column with at least one of a transmitter and receiver for an approximately vertical safety light barrier in the form of a multi-beam protective field covering an area;
    a reflection light scanner above the floor at the front of the machine in the vicinity of the entrance or access opening, which emits a scanning beam covering a horizontal or inclined area with specifiable at least one of inclination ($\alpha$) and geometry, which generates an inner permanent and outer dynamic protective field; and
    including a reduction in the cross-section of the columns in the form of perforations in the direction of the scanning beam.

23. Optoelectric safety system for a machine that operates with at least some mechanically dangerous operating presses, which comprises:
    a system which protects a free entrance or access opening in the machine's protective housing or protective cage at all times during operation, including:
    an approximately vertical column at either side of the entrance or access opening, each column with at least one of a transmitter and receiver for an approximately vertical safety light barrier in the form of a multi-beam protective field covering an area;
    a reflection light scanner above the floor at the front of the machine in the vicinity of the entrance or access opening, which emits a scanning beam covering a horizontal or inclined area with specifiable at least one of inclination ($\alpha$) and geometry, which generates an inner permanent and outer dynamic protective field; and
    including a reduction in the cross-section of the columns, wherein the columns are completely split through the cross-section thereof and the workpieces are held apart by rods.

* * * * *